Feb. 22, 1966 R. F. WILEY 3,236,620
GLASS BLOWING MACHINE BLOWHEAD AND ARTICLE COOLING
TUBE COMBINATION
Filed March 14, 1962
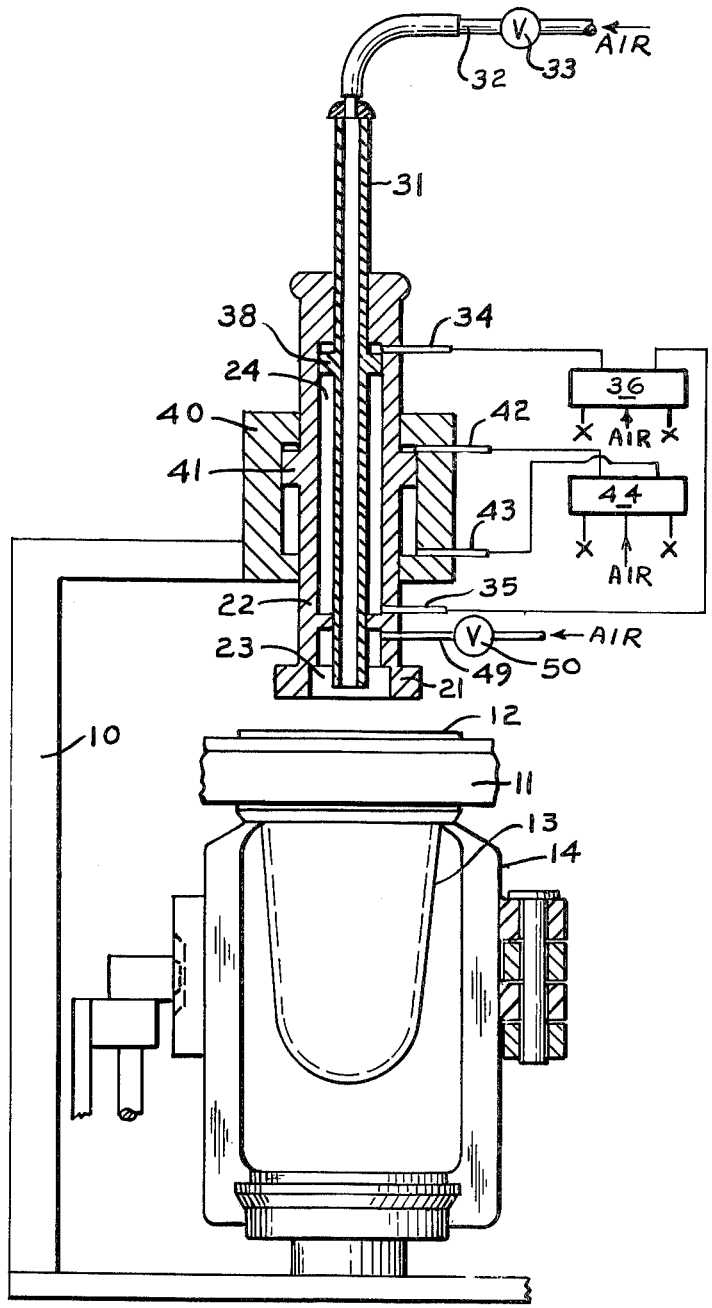
INVENTOR.
ROBERT F. WILEY
BY
Clarence R. Betty Jr.
ATTORNEY

United States Patent Office 3,236,620
Patented Feb. 22, 1966

3,236,620
GLASS BLOWING MACHINE BLOWHEAD AND ARTICLE COOLING TUBE COMBINATION
Robert F. Wiley, Corning, N.Y., assignor to Corning Glass Works, Corning, N.Y., a corporation of New York
Filed Mar. 14, 1962, Ser. No. 179,630
2 Claims. (Cl. 65—262)

The present invention relates to a combined blowhead and cooling tube assembly for use in glass article blowing machines. In such machines the article to be cooled is usually blown from a hollow parison suspended from a neck ring mold within the confines of a finishing mold, and the speed of operation of such machines is restricted by the lapse of time necessary for a blown article to cool to a setting temperature to prevent its becoming deformed after the removal of the finishing mold from thereabout.

According to the invention a blowhead is provided through which a cooling tube is projected into the finished article immediately after it is blown to final form and while the blowhead is being lifted from the neck ring mold, so that cooling air can be immediately passed through such tube and issued therefrom into the article at any desired or preferred level therein and the cooling air exhausted through the space surrounding the lifted blowhead.

For a detailed description of the invention reference is made to the accompanying figure of drawing depicting in elevation and partly in section a preferred embodiment thereof.

In the drawing there are shown fragments of a glass blowing machine embodying a neck ring mold support 11 which may conveniently be the machine turret carrying a neck ring mold 12 from which a glass parison 13 depends surrounded with a finishing blow mold 14.

Vertically aligned over the neck ring mold 12 is a blowhead 21 formed integral with a tubular support 22 containing a blowhead air supply chamber 23 and a hollow cylindrical space 24 utilized as a fluid cylinder.

An article cooling air supply tube 31 passes through the axial center of the bore of support 22 and at the top end is connected via a tube 32 to a cooling air supply source through a suitable valve 33. The lower open end of tube 31 terminates in the blowhead chamber 23. Fluid supply lines 34 and 35 extend to a valve 36 for connecting air to either line while connecting the other to atmosphere X to enable axial movement of the cooling tube by means of a piston 38 surrounding the tube within the cylindrical space 24.

Support 22 itself passes through a blowhead support cylinder 40 and is provided within such cylinder with a piston 41 enabling vertical movement of the blowhead into and out of association with neck ring mold 12 by the supplying of air alternately through lines 42 and 43 to such cylinder while connecting the other end of the cylinder to atmosphere via a suitable air supply valve 44. Blowing air is supplied to the blowhead cavity 23 via a line 49 containing a valve 50.

In operation of the apparatus, with the neck ring mold 12 aligned under the blowhead 21, as shown, valve 44 is operated to supply fluid to the upper end of cylinder 40 to lower the blowhead 21 into association with the neck ring mold. Valve 50 is then opened to direct air through the blowhead 21 into the parison 13 to expand it into a finished article within mold 14, the valve then being reclosed.

Valves 44 and 36 are then respectively operated to supply fluid to the lower end of cylinder 40 to raise the blowhead 21 off the neck ring mold 12, and to supply fluid to the top end of the cylindrical space 24 to lower the cooling tube 31 through the neck ring mold 12 down into the finished article. Immediately thereafter valve 33 is opened to direct cooling air through tube 31. Such air after impinging on the bottom of the article interior sweeps upward along its walls and passes to atmosphere. As will be understood, after desired cooling of the article has been effected, valve 33 is closed and the valve 36 operated to effect raising of tube 31 to its initial position.

The method of removal of the mold 14 from about the finished article and the method of release of such article from the neck ring mold 12 form no part of the present invention and may be carried out in a conventional fashion.

What is claimed is:

1. In a glass article blowing machine including a finishing mold having a cavity to which a hollow glass parison is supplied to be blown to final form, the combination comprising, a first cylinder rigidly mounted above said mold cavity with the bore of such cylinder in co-axial alignment with such cavity; a second cylinder extending through the bore of said first cylinder and carrying a blowhead on the lower end thereof, such second cylinder including a piston axially movable within the bore of said first cylinder; a cooling air supply tube extending through the bore of said second cylinder and including a piston axially movable within such bore; first and second valve means for selectively and separately supplying fluid to the bores of said cylinders to move said blowhead into and out of a glass article blowing relationship with said mold, and said supply tube into and out of the interior of a glass article blow-formed in such mold, respectively; and third and fourth valve means for separately controlling a supply of forming air and cooling air to said blowhead and said supply tube, respectively.

2. In combination with a glass forming machine including a finishing mold in which a hollow glass parison is enclosed for final blow-forming thereof into a glass article, the apparatus comprising; first and second concentric fluid cylinders such first cylinder rigidly supported over said mold in co-axial alignment therewith and such second cylinder extending through the bore of the first cylinder and having a piston slidably movable within such bore, the second cylinder also including a blowhead on the lower end thereof; a cooling air supply tube extending through the ends of said second cylinder and having a piston slidably movable within such bore, first valve means for selectively controlling a supply of fluid to said first cylinder to move said blowhead into a blow-forming relationship with said mold and to move said blowhead away from said mold following the blow-forming of a glass article therein, and second valve means for selectively controlling a supply of fluid to said second cylinder to move said tube into the interior of a glass article immediately following the forming thereof in said mold and to move said tube out of said article following a period of cooling thereof.

References Cited by the Examiner

UNITED STATES PATENTS

| | | | |
|---|---|---|---|
| 1,854,471 | 4/1932 | Hofmann | 65—348 |
| 2,123,145 | 7/1938 | Peiler | 65—262 |
| 2,282,848 | 5/1942 | Berthold | 65—181 X |
| 2,368,472 | 1/1945 | Jardine | 65—243 X |
| 2,442,315 | 5/1948 | Samuelson et al. | 65—262 |
| 2,758,571 | 8/1956 | Mackintosh | 92—113 X |

FOREIGN PATENTS 535,013    9/1931    Germany.

DONALL H. SYLVESTER, *Primary Examiner.*